United States Patent Office 2,954,317
Patented Sept. 27, 1960

2,954,317

METHODS AND COMPOSITION FOR CONTROL OF PARASITES

Eugene E. Kenaga, Midland, Mich., assignor to The Dow Chemical Company, Midland, Mich., a corporation of Delaware No Drawing. Filed Apr. 15, 1959, Ser. No. 806,440

6 Claims. (Cl. 167—22)

This invention is concerned with parasiticides and is particularly directed to compositions and methods for the control of parasitic organisms.

It is an object of the present invention to provide novel compositions to be employed in the control of many household, industrial, and agricultural pests. Another object is to provide an improved method employing the said novel compositions for parasite control. A further object is to provide compositions adapted to be applied to the aerial portions of plants for the control of plant pests without substantial injury to the plant. Additional objects will become apparent from the following specification and claims.

According to the present invention, it has been discovered that 1-dimethoxyphosphinyl lower alkenylidene dimethyl phosphates, inclusive of 1-dimethoxyphosphinyl lower chloroalkenylidene dimethyl phosphates corresponding to the formula

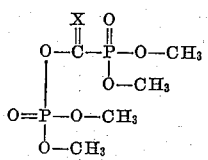

wherein X is a member selected from the group consisting of an alkylidene and a chloroalkylidene radical containing from 1 to 2 carbon atoms, inclusive, are effective parasiticidal toxicants and are adapted to be employed for the control of many agricultural, household, and industrial pests. Typically, these phosphates are colorless liquids soluble in many common organic solvents and of various solubilities in water. They may readily and conveniently be employed for the control of many parasitic organisms and particularly such organisms parasitic upon the above-ground portions of desired growing plants, to which the compounds and compositions containing the compounds may be applied in pesticidal amounts without serious injury to the plant.

In one method of practicing the present invention, the pest organism may be controlled by contacting such organism, its habitat, its food, or several of these with at least a parasiticidal amount of the unmodified phosphate. Also, in such method, liquid or dust compositions containing at least one of the present phosphates may be employed. Desirably, the phosphates may be formulated with one or more of many additaments including solvents, aqueous carriers, surface active dispersing agents, finely divided inert solids, and the like. Depending upon the concentration in such formulation, such compositions may be employed directly or may be employed as concentrates subsequently to be diluted with additional inert pesticidal carrier to produce the ultimate compositions to be employed. In compositions to be employed as concentrates, the toxicant may be present in a concentration of from 5 to about 95 percent or more by weight. The concentration of the phosphate toxicant in pesticidal compositions is not critical, provided a parasiticidal amount of toxicant is supplied to the organism, its environment, or its food. The amount of such toxicant is primarily dependent upon the susceptibility of the organism to be controlled to the toxic action of the present phosphate substances. When it is inconvenient to regulate the actual amount of phosphate contacting the pest or its environment or ingested by such pest, good results are obtained by applying to the pests, their environment, or their food, a liquid or solid composition containing from about 1 to about 10,000 or more parts of toxicant per million parts by weight of total liquid composition, although compositions containing much higher concentrations of toxicant may be successfully employed. One or more of the present phosphates may be compounded with a finely divided solid to prepare a dust composition. In such operations, the said solid which may be pyrophyllite, diatomaceous earth, gypsum, talc, chalk, attapulgite, bentonite and other clays or the like may be ground or mechanically mixed with the toxicant or wet with a solution or emulsion of the toxicant. When a wettable powder product is desired, a surface active agent is usually included in the composition. The resulting dust compositions may be employed as concentrates to be diluted with additional solid surface active dispersing agent or with inert pesticidal carrier solids or may be dispersed in water to form sprays, drenches, or washes.

The present phosphate toxicants may be compounded with water-immiscible solvents and surface active dispersing agents to produce liquid concentrates which may be further diluted with organic solvents to form spray mixtures or may be dispersed in water to prepare aqueous emulsions or may be diluted with water and oil mixtures. In such compositions, the pesticide is carried in the oil phase. Preferred dispersing agents in such compositions are oil soluble, and include the non-ionic emulsifiers such as the condensation product of an alkylene oxide with a phenol and an organic acid, polyoxyethylene derivatives of sorbitan esters, complex ether alcohols and the like. However, oil soluble ionic emulsifying agents such as mahogany soaps may also be used. Suitable solvent liquids to be employed in the present compositions include petroleum oils and distillates, toluene, xylene, liquid halohydrocarbons, and synthetic organic oils.

In practicing the present invention, the present phosphate toxicants or at least one composition containing such toxicant may be applied to the pests to be controlled, to their habitat or to their food in any convenient fashion such as by means of hand or power dusters or sprayers which may be mechanically transported, or by admixture with food which may be food of natural occurrence or may be purposely supplied as poison bait. In large scale operations, the present compositions may be applied from aircraft. When applying the present compositions to above-ground portions of desired plants the employed compositions should not contain appreciable amounts of phytotoxic diluents.

The 1-dimethoxyphosphinyl alkenylidene dimethyl phosphates employed in the present invention may be prepared by causing a reaction between trimethylphosphite and an alkanoyl halide which may be chloroalkanoyl chloride. The reaction may be carried out in an organic liquid such as benzene as reaction medium; is somewhat exothermic, and takes place smoothly in the temperature range of from −10° to +35° C. with the production of the desired phosphate and alkyl halide of reaction. Good results are obtained when employing approximately 2 molecular proportions of the starting trimethylphosphite for each molecular proportion of the alkanoyl halide. In carrying out the reaction, the phosphite is added slowly, portionwise, and with stirring to the alkanoyl halide or chloroalkanoyl halide and solvent, if employed. Upon completion of the addition, the reaction mixture may be stirred for a period of time to insure completion of the reaction and thereafter fractionally distilled under atmospheric pressure to obtain the desired product.

The following examples illustrate the invention but are not to be construed as limiting.

*Example 1*

Twenty-five parts of 2-chloro-1-(dimethoxyphosphinyl)vinylidene dimethylphosphate, having a boiling temperature of 138° to 142° C. at 0.1 millimeter pressure, 65 parts of xylene and 10 parts of an alkylated aryl polyether alcohol, all parts by weight, are mechanically mixed to prepare an emulsifiable concentrate composition.

Similarly, 90 parts of 1-(dimethoxyphosphinyl)vinylidene dimethylphosphate, boiling in the range of 129–131° C. at 0.1 millimeter pressure, and 10 parts by weight of a sorbitan monolaurate polyoxyethylene derivative ("Tween 20") are mixed to prepare a water-dispersible concentrate composition.

By weight, 25 parts of 1-(dimethoxyphosphinyl)propenylidene dimethylphosphate, 10 parts of diatomaceous earth, 2 parts of a sodium salt of a substituted benzoid alkyl sulfonic acid (Daxad No. 27) are mechanically mixed and ground together to prepare a wettable powder concentrate composition. These concentrate compositions may be diluted with oil, with finely divided solids, or may be dispersed in water to provide compositions to be applied to undesired pests or their habitats and food to control such pests.

*Example 2*

An aqueous spray composition containing 12 parts of 1-(dimethoxyphosphinyl) vinylidene dimethylphosphate per million parts of ultimate composition was employed to wet thoroughly cranberry bean plants heavily infested with *Tetranychus bimaculatus*, the two-spotted spider mite, an arachnid. At the end of 72 hours, the plants were examined and 100 percent kill of the mites was observed.

*Example 3*

An aqueous composition comprising 25 parts of 2-chloro-1-(dimethoxyphosphinyl) vinylidene dimethylphosphate per million parts of ultimate composition was applied thoroughly to wet cranberry bean plants which were thereafter infested with a known number of third instar Mexican bean beetle larvae. The larvae were allowed unrestricted feeding on the bean plants. One week after infestation, the plants were examined and a 100 percent kill of the Mexican bean beetles was noted.

*Example 4*

An aqueous composition comprising 500 parts (2,2-dichloro-1-(dimethoxyphosphinyl) vinylidene dimethylphosphate per million parts of ultimate composition was applied thoroughly to wet dwarf nasturtium plants (*Tropaeoleum minus L.*) heavily infested with *Aphis fabae*, the common bean aphid. The said plants were examined 72 hours later and a 100 percent kill of the bean aphids was noted.

In each of the foregoing examples, as checks, similar operations were performed except that in no such operation was any of the present phosphates employed as toxicant. In such check operation, the said insect and arachnid pests remained virtually unaffected. In all tests set forth in the foregoing examples, no serious injury to any of the plants was noted.

I claim:

1. A method which comprises bringing into contact with pests selected from the group consisting of insects and arachnids, a parasiticidal amount of a toxicant corresponding to the formula

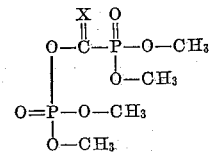

wherein X is a member selected from the group consisting of an alkylidene and a chloroalkylidene radical containing from the group consisting of an alkylidene and a chloroalkylidene radical containing from 1 to 2 carbon atoms, inclusive.

2. A composition comprising an inert parasiticidal carrier in admixture with a toxicant corresponding to the formula

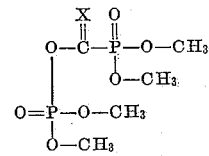

wherein X is a member selected from the group consisting of an alkylidene and a chloroalkylidene radical containing from 1 to 2 carbon atoms, inclusive.

3. A composition claimed in claim 2 wherein the inert parasiticidal carrier is a finely divided solid.

4. A composition claimed in claim 2 wherein the toxicant is present in the amount of at least 1 part per million parts by weight of ultimate composition.

5. A composition claimed in claim 4 wherein the inert parasiticidal carrier is a liquid solution of a surface active dispersing agent.

6. A concentrate composition comprising a surface active dispersing agent in intimate association with a toxicant corresponding to the formula

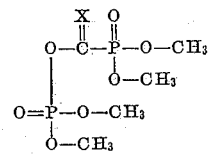

wherein X is a member selected from the group consisting of an alkylidene and a chloroalkylidene radical containing from 1 to 2 carbon atoms, inclusive.

References Cited in the file of this patent

UNITED STATES PATENTS 2,849,476    McConnell _____ Aug. 26, 1958

UNITED STATES PATENT OFFICE
CERTIFICATION OF CORRECTION

Patent No. 2,954,317                  September 27, 1960

Eugene E. Kenaga

It is hereby certified that error appears in the above numbered patent requiring correction and that the said Letters Patent should read as corrected below.

Column 3, line 4, for "atmospheric" read -- subatmospheric --; column 4, lines 22 and 23, strike out "from the group consisting of an alkylidene and a chloroalkylidene radical containing".

Signed and sealed this 23rd day of May 1961.

(SEAL)
Attest:

ERNEST W. SWIDER                  DAVID L. LADD
Attesting Officer                  Commissioner of Patents